Figure 1:
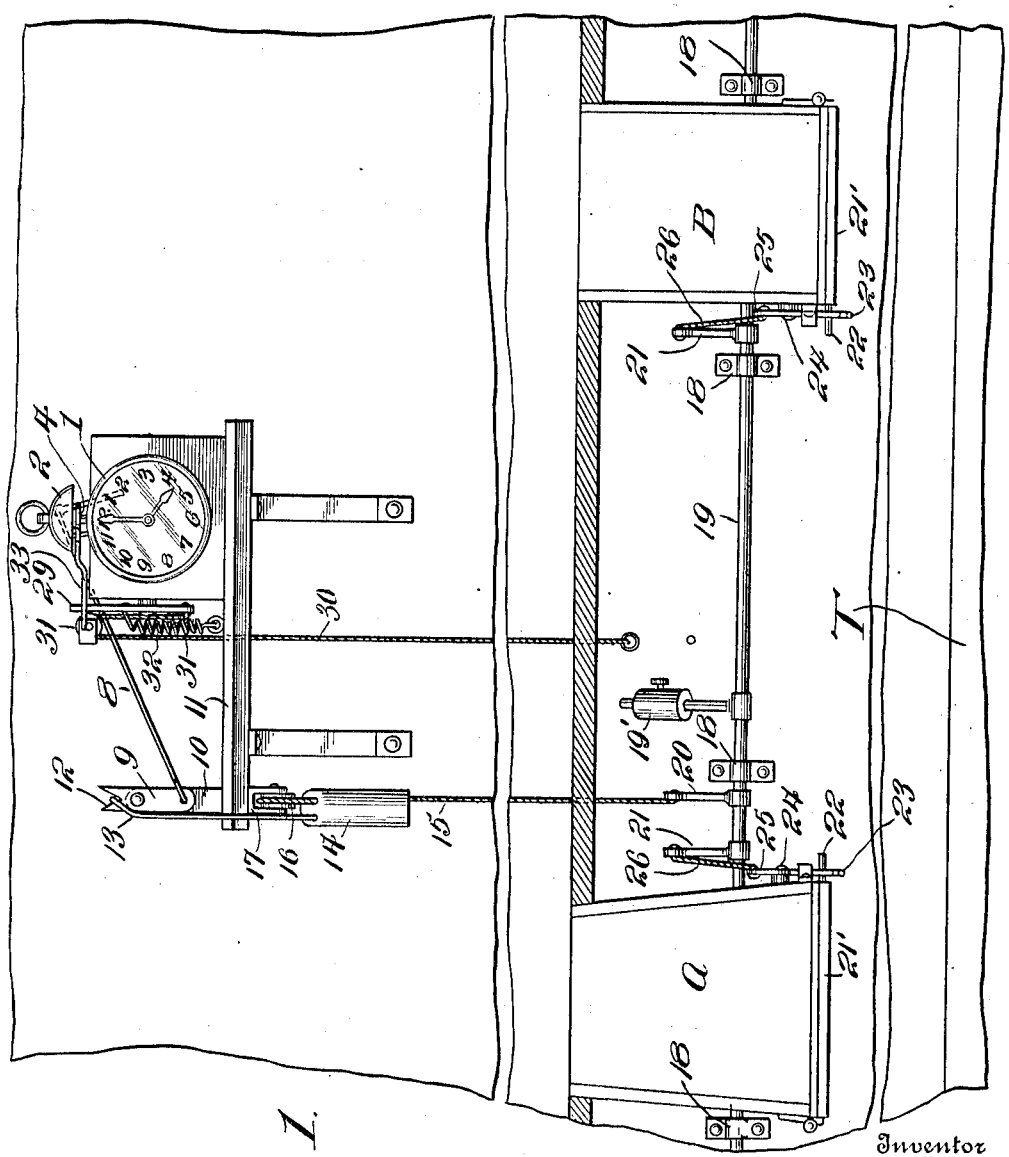

J. C. AHERN.
FEEDING APPARATUS.
APPLICATION FILED MAR. 19, 1912.

1,054,482.

Patented Feb. 25, 1913.
2 SHEETS—SHEET 1.

Witnesses
J. T. L. Wright
John J. McCarthy

Inventor
James C. Ahern,
By Victor J. Evans,
Attorney

J. C. AHERN.
FEEDING APPARATUS.
APPLICATION FILED MAR. 19, 1912.
1,054,482.
Patented Feb. 25, 1913.
2 SHEETS—SHEET 2.
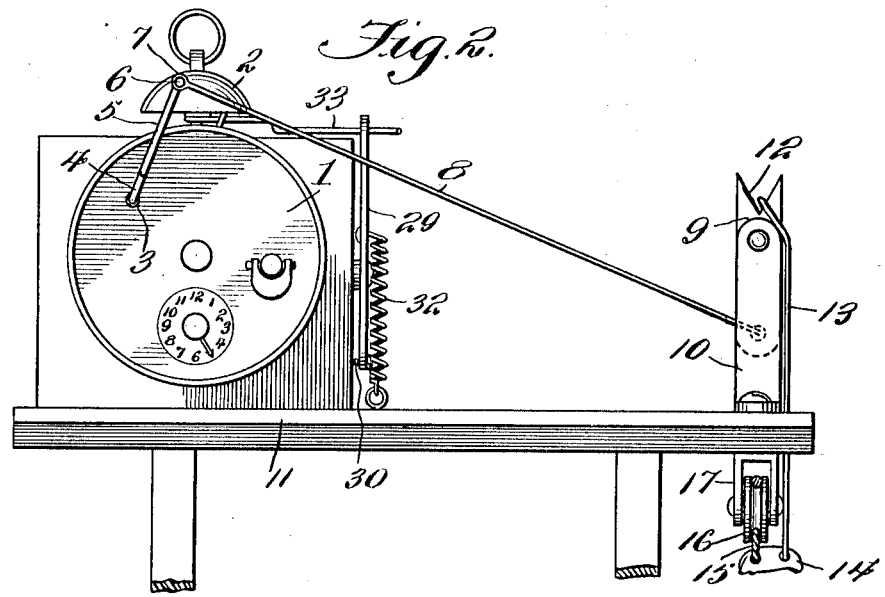
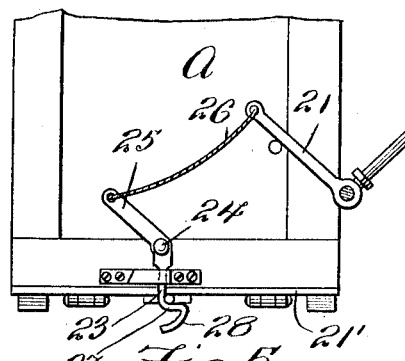
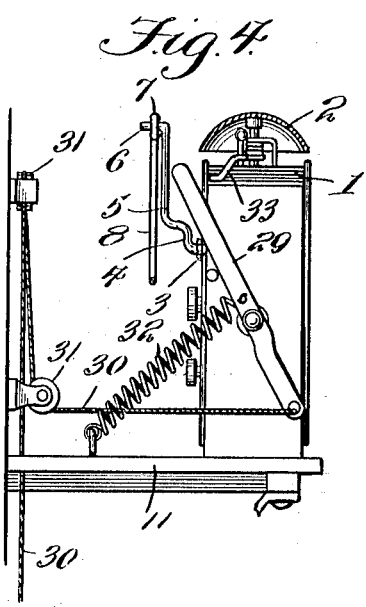
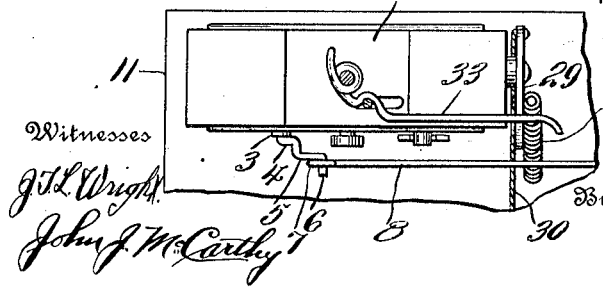
Witnesses
Inventor
James C. Ahern,
By Victor J. Evans
Attorney

UNITED STATES PATENT OFFICE.

JAMES C. AHERN, OF INDIANAPOLIS, INDIANA.

FEEDING APPARATUS.

1,054,482.  Specification of Letters Patent.  Patented Feb. 25, 1913.

Application filed March 19, 1912. Serial No. 684,678.

*To all whom it may concern:*

Be it known that I, JAMES C. AHERN, a citizen of the United States of America, residing at Indianapolis, in the county of Marion and State of Indiana, have invented new and useful Improvements in Feeding Apparatus, of which the following is a specification.

My present invention relates to improvements in feeding apparatuses and has particular application to an apparatus of this type designed especially for use in barns and buildings of a like nature for the purpose of feeding animals.

In carrying out the invention, it is my purpose to provide an apparatus of the above-stated character whereby the food may be discharged into the trough at a predetermined interval of time.

Furthermore, it is my purpose to provide a feeding apparatus wherein by means of a timing mechanism, a plurality of bins or like receptacles may be operated to discharge their contents into a trough so as to permit feeding of the animal or animals at a prescribed period of time without necessitating the care and labor usually required in the feeding of animals.

The invention also involves the provision of a hopper adapted to contain a quantity of material and provided with a drop bottom, a timing mechanism and a trigger connected to the latter mechanism and operable therefrom and having a connection with the drop bottom of the hopper to open the latter in the operation of the timing mechanism.

With the above-recited objects and others of a similar nature in view, the invention consists in the construction, combination and arrangement of parts hereinafter set forth in and falling within the scope of the appended claims.

In the drawings; Figure 1 is a diagrammatic view of an apparatus constructed in accordance with the present invention. Fig. 2 is a rear view of a timing mechanism and its connection with the trigger. Fig. 3 is a fragmentary side elevation showing the means for releasing the drop bottom of the hopper. Fig. 4 is a side elevation of the timing mechanism showing a lock therefor. Fig. 5 is a detail view showing a portion of the means for stopping the alarm after the trigger is operated.

Similar reference characters designate like parts throughout the several views.

Referring now to the accompanying drawings in detail, my improved apparatus, as shown, comprises a timing mechanism 1 which in the present instance is in the form of a clock having a suitable alarm device including a bell 2 and which may be set to operate at any prescribed period of time. Connected to the winding key 3 of the alarm device is an arm 4 provided with an offset portion 5 terminating in a right angular pin 6. Loosely encircling the pin 6 of the arm 4 is an eye 7 of a rod 8, the free end of which is pivotally connected to one end of a trigger 9 fulcrumed intermediate its ends upon a standard or bracket 10 rigidly secured to a platform 11 adjacent one side of the timing mechanism 1, which latter is also mounted upon the base or platform. The timing mechanism and the trigger are preferably mounted in the loft of the barn or the like structure and have connections with bins or hoppers arranged within the barn beneath the loft so that the feeding or discharge of the material from the hoppers may be brought about at a point remote from the animal trough. The free end of the trigger 9 is formed with a substantially V-shaped slot 12 adapted to receive a loop 13 of a weighted element 14. One end of a flexible connector 15 such as a cord, chain or the like is also connected to the weighted element 14 and is trained over a sheave 16 within a block 17 fastened to the under surface of the base or platform 11.

Journaled in brackets 18 secured to a suitable support, is a shaft 19 provided with a balance weight 19' and equipped with an arm 20 connected to the free end of the connector 15 and operable therefrom to rotate the shaft within its brackets. Rigidly secured to the shaft 19 and rotatable therewith are a plurality of levers 21, two being shown as an example, located adjacent the bins or hoppers A and B which latter are capable of containing a quantity of material and are designed to discharge the same into a trough T located below such hoppers. Each hopper, as shown, is provided with a drop or swinging bottom 21 hingedly connected to the main body of the hopper and provided with a laterally projecting pin 22 adapted to be engaged by a catch 23 fulcrumed as at 24 to one side wall of the hopper and terminating in an angular arm 25 projecting in a forward direction with respect to the shaft 19 and connected to the lever 21 of such shaft through the medium of a chain 26 or the like so that in the movement of the shaft, the arm 25 of the catch 23 may be swung about its fulcrum 24 to release the pin 22 and permit the bottom 21 of the hopper to swing to an open position, whereby the material within the hopper will be discharged into its respective trough. The catch 23 is preferably formed with a right angular projection 27 adapted to engage the pin 22 to hold the swinging bottom of the hopper in closed position, said projection terminating in a relatively reversely projecting curve-shaped depending segment 28 designed to be engaged by the pin 22 of the drop bottom when the latter is being restored or moved to its closed position so as to swing the catch about its fulcrum and throw the same out of the path of movement of the pin 22, subsequent to which action the catch swings back, of its own accord, to engage the projection 27 with the pin 22.

The operation of the mechanism just described may be briefly stated as follows: Assuming the bins A and B to be filled with material, such as hay, oats or the like and it is desired to discharge the contents from the bins at a prescribed time, the alarm device of the clock or other timing mechanism is set to such time and the loop 13 engaged in the notch 12 of the trigger 9. When the timing mechanism has reached the desired period, the alarm device is operated and swings the arm 4 and rod 8 to throw the trigger 9 to a relatively right angular position, as shown by the dotted lines in Fig. 1, whereby the weight 14 is released and in its downward movement operates the connector 15 which latter through the medium of the arm 20 rotates the shaft 19 in its brackets 18, consequently relieving the drop bottom 21 of the hopper from the influence of the catch.

The numeral 29 indicates a shifter lever fulcrumed intermediate its ends to one side of the timing mechanism 1. Secured to one end of the shifter lever 29, is an operating cord 30 trained over suitable guide sheaves 31 and extending downwardly to a point adjacent the troughs T, while a spring 32 is connected to the shifter lever upon the opposite sides of its pivotal connection and exerts its tension to hold the lever 29 in an inoperative position. The upper end of this shifter lever 29, upon a pull being exerted at the lower end of cord 30, is adapted to engage a locking arm 33 pivotally secured to the timing mechanism and designed to normally engage the hammer of the alarm bell, the locking arm 33 being rendered inoperative with respect to the hammer in the operation of the lever 29.

From the above description taken in connection with the accompanying drawings, it will be seen that I have provided a feeding apparatus which may be set to feed an animal or animals at any desired time and which is entirely automatic in its action, thereby insuring the proper feeding of the animals without necessitating the inconvenience and labor usually required for this purpose.

I claim:

1. In an automatic feeding apparatus, a hopper adapted to contain a quantity of material and provided with a drop bottom, a timing mechanism, an arm connected to the winding key of said mechanism and terminating in a right angular pin, a rod having an eye in one end encircling said pin, a trigger fulcrumed between its ends, a connection between one end of said rod and one end of the trigger, a shaft, a weight for operating said shaft, a connection between said weight and trigger whereby the weight is held inactive upon the shaft, a catch adapted to hold the bottom of said hopper in closed position, a connection between said catch and shaft to release the drop bottom of said hopper, and means operable from the timing mechanism to release the said arm whereby motion will be imparted to said shaft.

2. A feeder comprising a hopper adapted to contain a quantity of material and provided with a swinging bottom, a timing mechanism, a trigger connected to said timing mechanism and operable therefrom, a shaft, a connection between said trigger and shaft, a catch adapted to hold the bottom of said hopper in closed position and comprising a pin carried by the swinging bottom of the hopper, an arm pivoted upon the hopper and terminating in a right angular projection adapted to engage the pin on the said swinging bottom, said projection terminating in a reversely extending curve shaped depending segment adapted to be engaged by the pin whereby the bottom may be swung to closed position, and a connection between said arm and shaft to release the drop bottom of the hopper.

In testimony whereof I affix my signature in presence of two witnesses.

JAMES C. AHERN.

Witnesses:
O. A. SOPER,
CATHERINE J. SOPER.